United States Patent [19]

Taber et al.

[11] 4,145,085
[45] Mar. 20, 1979

[54] DUMP TRAILER

[76] Inventors: Loren H. Taber, Star Route Box 11, Woodland, Calif. 95607; David R. Neilson, 809 2nd St.; Stefan Fuchslin, 814 Rosewood Way, both of Woodland, Calif. 95695

[21] Appl. No.: 842,475

[22] Filed: Oct. 17, 1977

[51] Int. Cl.² .......................................... B62D 63/06
[52] U.S. Cl. ..................................... 298/5; 280/446 B
[58] Field of Search ................... 298/5, 6, 19 R, 21 R, 298/22 R; 280/446 B, 488, 492, 446 R

[56] References Cited
U.S. PATENT DOCUMENTS

| | | | |
|---|---|---|---|
| 2,890,065 | 6/1959 | Shoffer | 280/492 |
| 2,940,776 | 6/1960 | Curtis | 280/446 B |
| 3,730,557 | 5/1973 | Cox | 280/492 |
| 3,879,061 | 4/1975 | Thompson | 280/406 A |

FOREIGN PATENT DOCUMENTS

| | | | |
|---|---|---|---|
| 910714 | 11/1962 | United Kingdom | 298/5 |
| 969279 | 9/1964 | United Kingdom | 298/5 |

Primary Examiner—Francis S. Husar
Assistant Examiner—Ross Weaver
Attorney, Agent, or Firm—Lothrop & West

[57] ABSTRACT

A bellcrank lever is pivotally connected at its elbow to a tow vehicle such as a tractor. A generally horizontal arm of the bellcrank lever is pivotally connected to the lower front portion of a trailer bed through a universal joint and a centering mechanism. The after end of the bed is supported by two rear wheels. A hydraulically actuated mechanism connected between the vehicle and an upwardly extending arm of the bellcrank lever pivots the bellcrank lever in a vertical plane thereby selectively raising or lowering the front of the bed. The universal joint allows towing and dumping at a considerable angle of lateral tilt of the bed relative to the vehicle and the centering mechanism maintains the trailer in fore and aft alignment.

2 Claims, 8 Drawing Figures

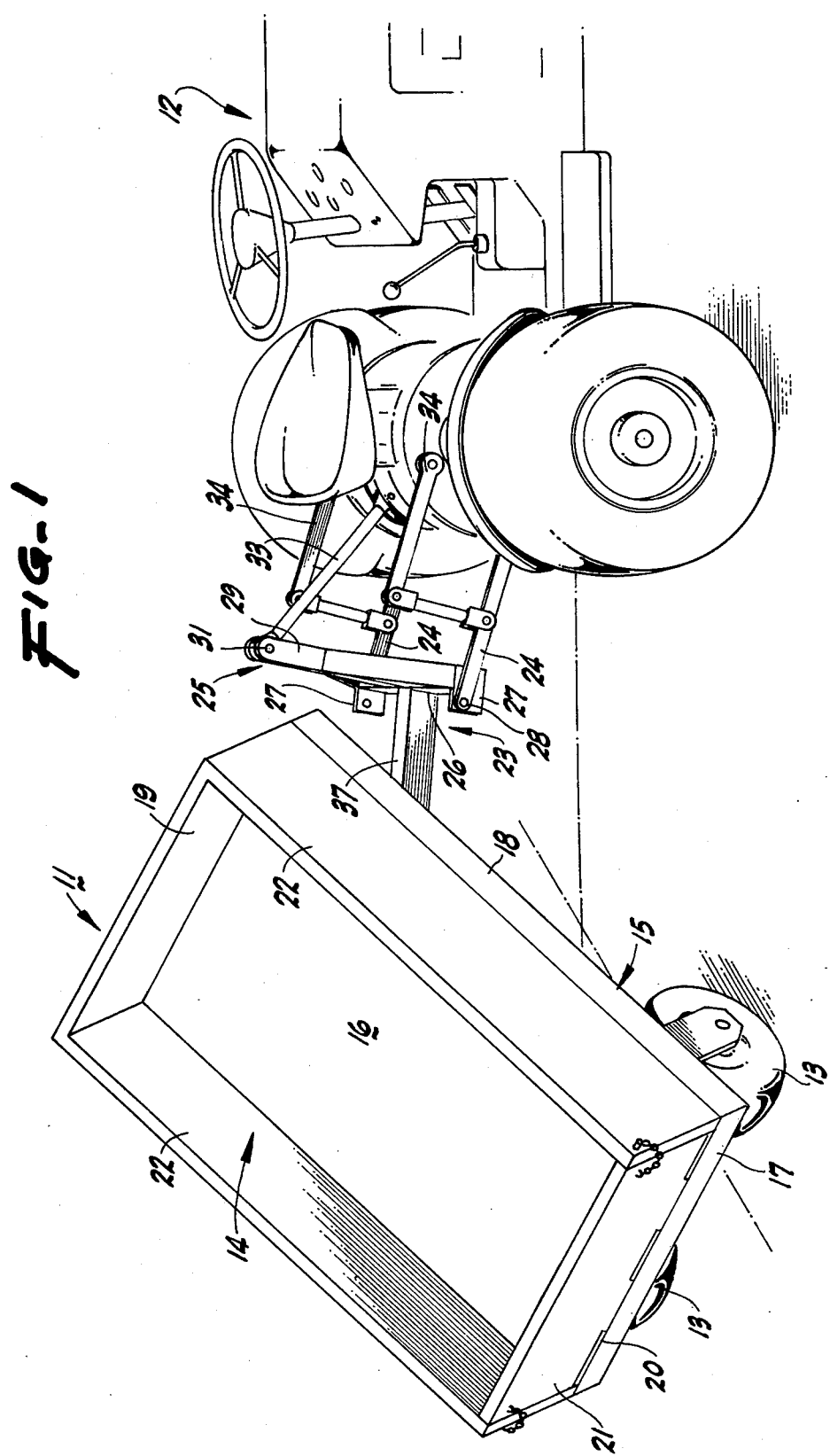

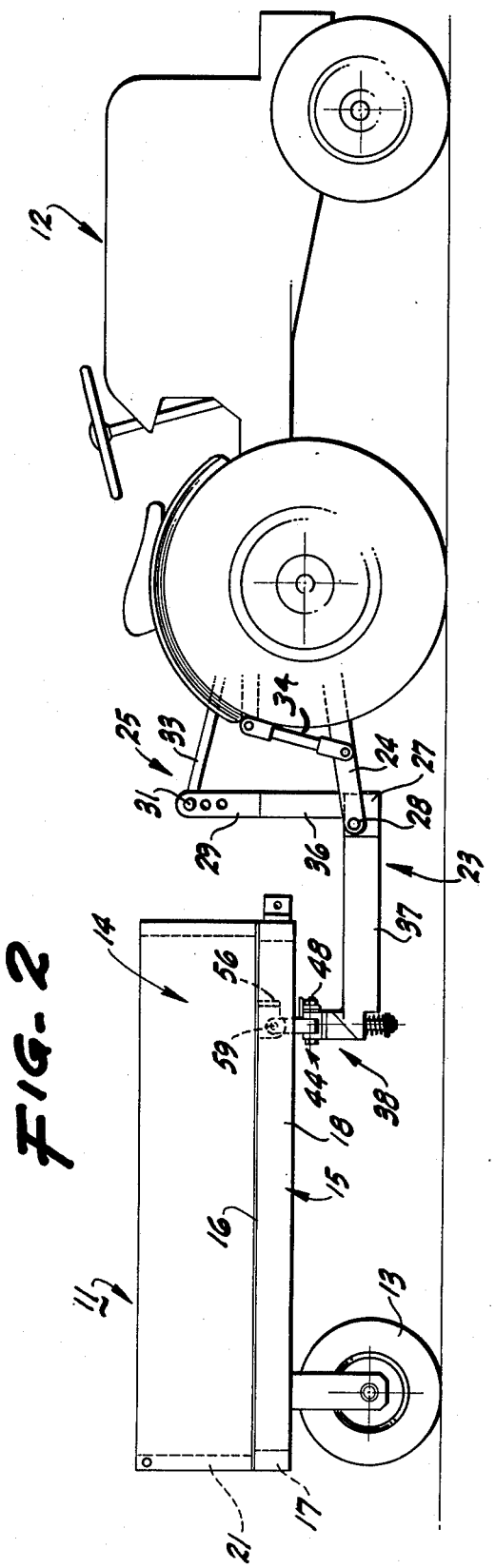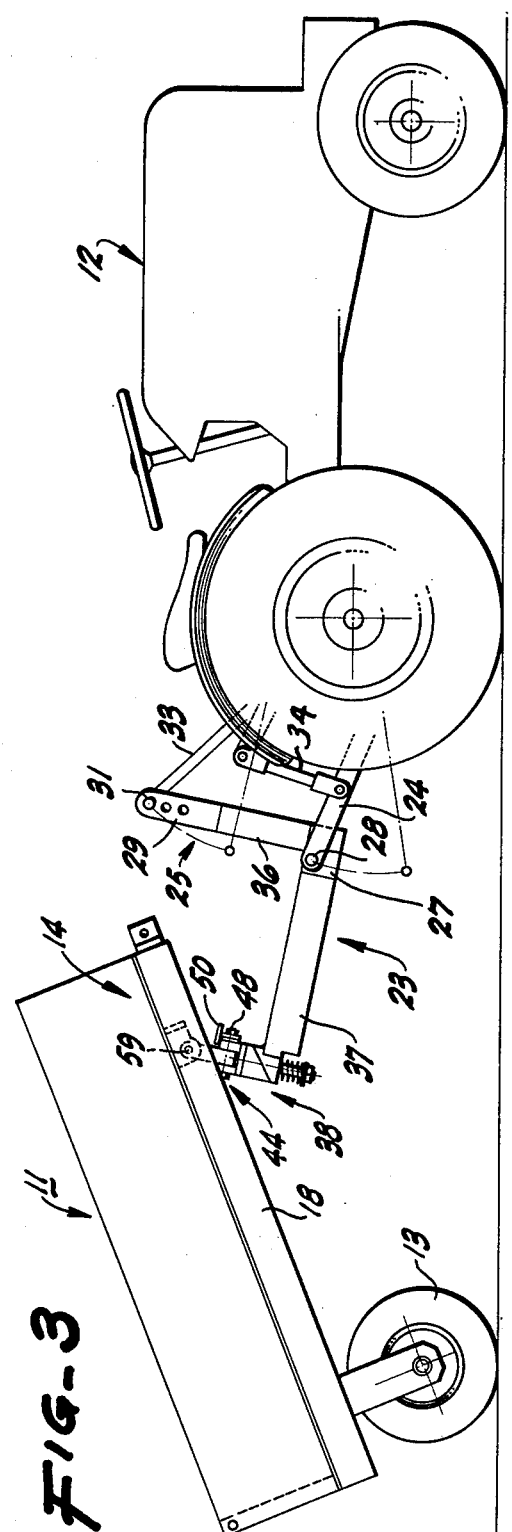

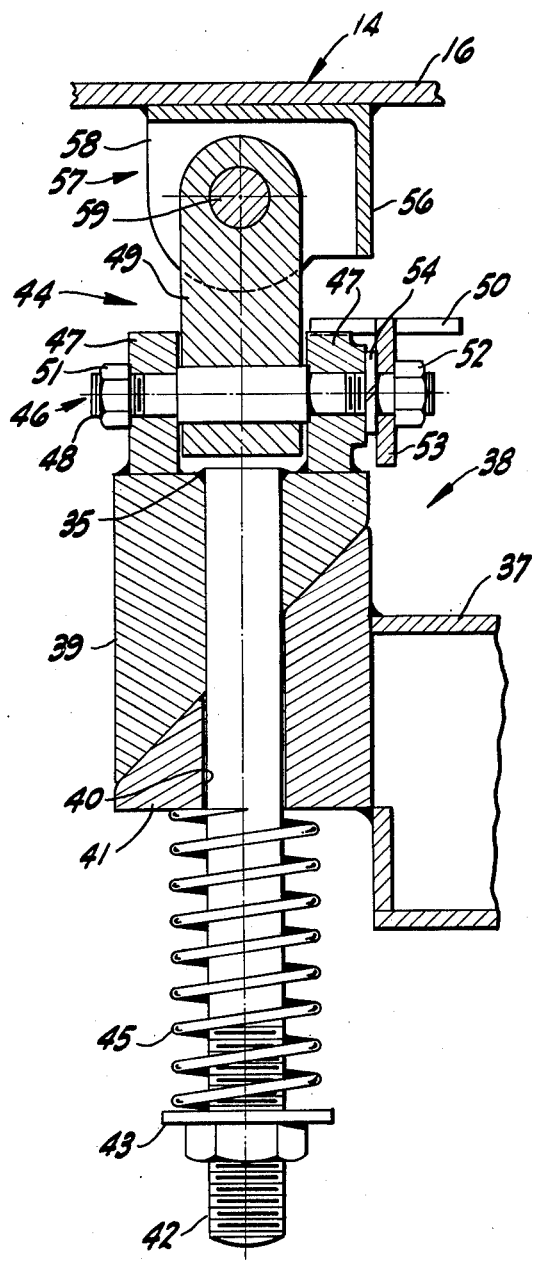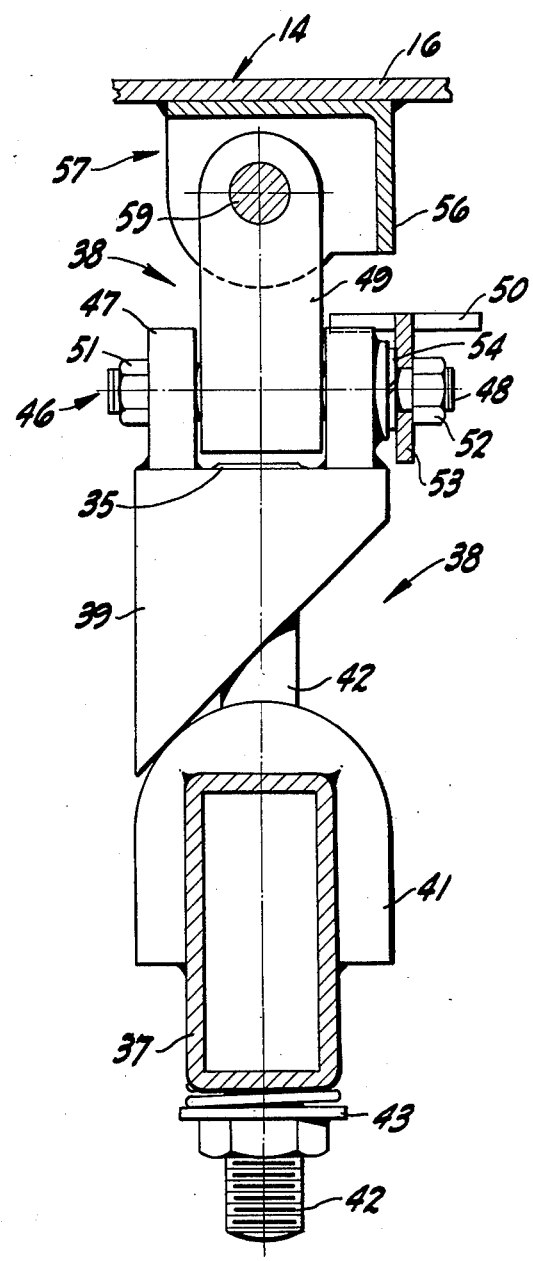

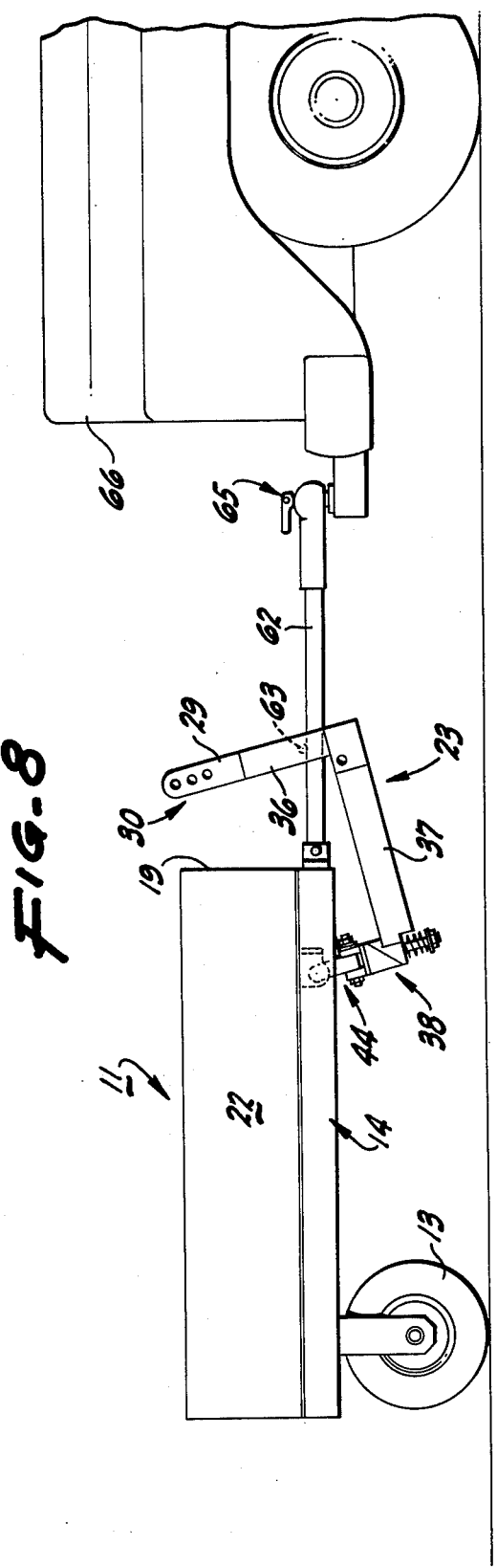

DUMP TRAILER

BACKGROUND OF THE INVENTION

Two-wheeled or semi-trailers are well known in art. These trailers comprise a bed supported at the rear by a pair of wheels. The front of the trailer is connected to a vehicle such as a truck or tractor for towing. In such a trailer the load is borne by the combination of the rear wheels and the towing vehicle.

It has been conventional to connect a two-wheeled trailer to the vehicle by an articulated linkage which not only acts as a draft member but also transfers the load from the front part of the trailer to the vehicle. An adaptation of such a linkage which further allows the trailer to be tilted backwardly for dumping is disclosed in U.S. Pat. No. 3,066,983 to J.A.M. Bay. Although the Bay linkage achieves its intended function of eliminating a pivot connection between the trailer bed and the trailer chassis, it is rather complicated and expensive to construct. Furthermore, it does not take advantage of the hydraulically actuated hitches available on many present-day tractors; instead, Bay requires a separate hydraulic jack.

SUMMARY OF THE INVENTION

The present invention relates to a dump trailer. The relatively complicated articulated linkage found in conventional semi-trailers of comparable type is replaced by a single bellcrank lever pivotally mounted at three points to a hitch on the rear portion of a tow vehicle such as a tractor. A lower, generally horizontal arm of the bellcrank is pivotally connected to the lower front portion of the trailer bed through a universal joint and a centering mechanism. A conventional hydraulically actuated linkage on the towing vehicle is mounted at two points on the elbow of the bellcrank and at one point on the top of the upwardly extending arm of the bellcrank. The linkage selectively pivots the bellcrank lever in a vertical plane to raise the front of the trailer bed for dumping or to lower the bed for towing. The bellcrank lever not only serves as a draft bar but also supports the front of the bed and establishes the angular attitude of the bed. The universal joint allows towing and dumping to take place at a substantial roll angle of the bed relative to the vehicle and the centering mechanism keeps the trailer tracking in a fore and aft path despite bumpy road conditions and lateral deflecting forces.

It is an object of the invention to provide a two-wheeled dump trailer of simplified but improved construction.

It is another object of the invention to provide a dump trailer which is lower in fabrication cost but functions more effectively than prior art trailers of comparable type.

It is still another object of the invention to provide a dump trailer which most effectively lends itself to connection to a three point tractor hitch.

It is another object of the invention to provide a generally improved two-wheeled dump trailer.

Other objects, together with the foregoing, are attained in the embodiment described in the following description and illustrated in the accompanying drawing.

BRIEF DESCRIPTION OF THE DRAWING

FIG. 1 is a perspective view showing a dump trailer of the present invention operatively connected to a tractor, the trailer being shown in dumping attitude and with the trailer's longitudinal axis at an angle to the fore and aft axis of the tractor;

FIG. 2 is a side elevational view of the trailer and tractor in a horizontal towing attitude;

FIG. 3 is a view comparable to FIG. 2 but with the trailer in a tilted or dumping attitude;

FIG. 4 is a fragmentary side elevational view, to an enlarged scale, showing a universal joint and centering mechanism of the present trailer in a centered orientation, portions of the centering mechanism and bellcrank arm being shown in section;

FIG. 5 is a view comparable to FIG. 4 but with the centering mechanism in an angularly displaced or non-centered orientation;

DETAILED DESCRIPTION OF PREFERRED EMBODIMENT

Figure 6:
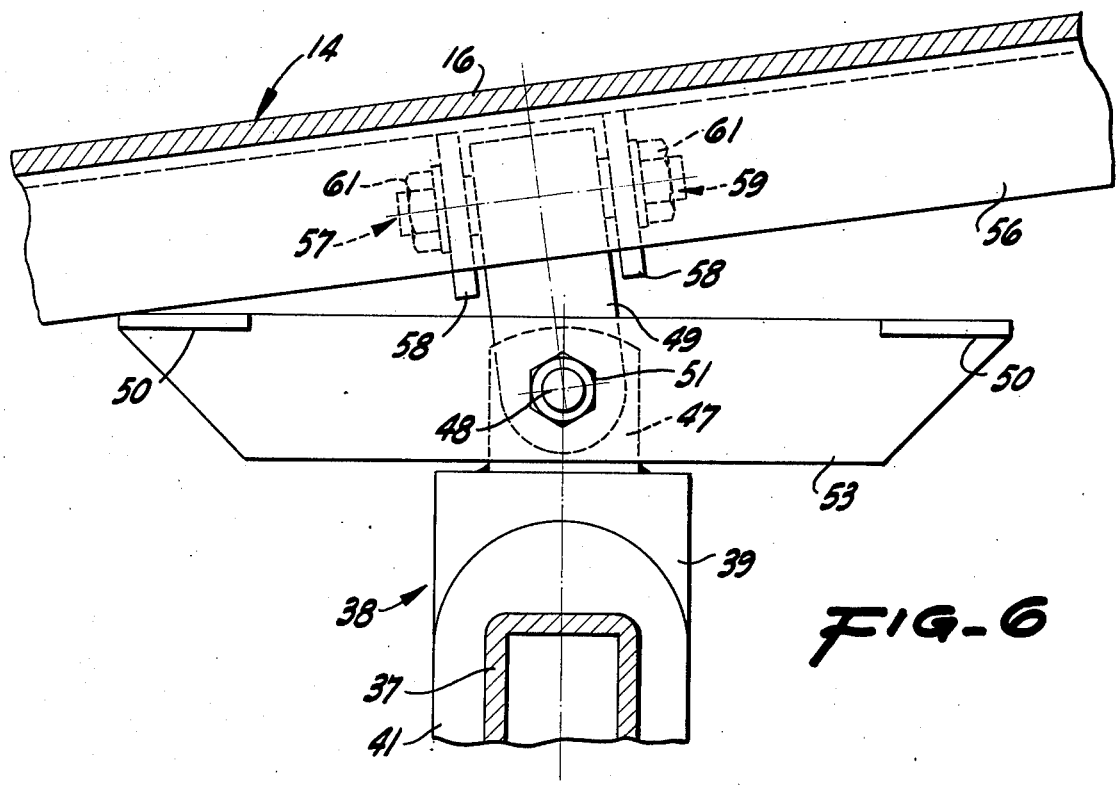
FIG. 6 is a fragmentary front elevational view, to an enlarged scale, showing the universal joint, the upper portion of the centering mechanism and the transverse limit stop bar with the trailer bed tilted laterally to a limit position.

While the dump trailer of the invention is susceptible of numerous physical embodiments, depending upon the environmental and requirements of use, the herein shown and described embodiment has been made, tested and used, and has performed in an eminently satisfactory manner.

With particular references to FIGS. 1, 2, 3 and 8, a two-wheeled dump trailer of the present invention, generally designated by the reference numeral 11, is operatively connected to a towing vehicle, such as a conventional tractor 12. The trailer 11 is provided with two rear ground engaging wheels 13 which support the rear portion of a bed 14 comprising a flat plate 16 mounted on a chassis 15 including a pair of transverse end channels 17 and a pair of lateral fore and aft channels 18. A vertical front wall 19 is permanently secured to the front of the bed 14. A rear wall 21 and a pair of side walls 22 are suitably mounted on the bed 14 to form the trailer body. Preferably, the after wall 21 of the trailer is hinged to the bed as by hinges 20, to facilitate emptying of the contents when the trailer is in dumping mode.

Figure 7:
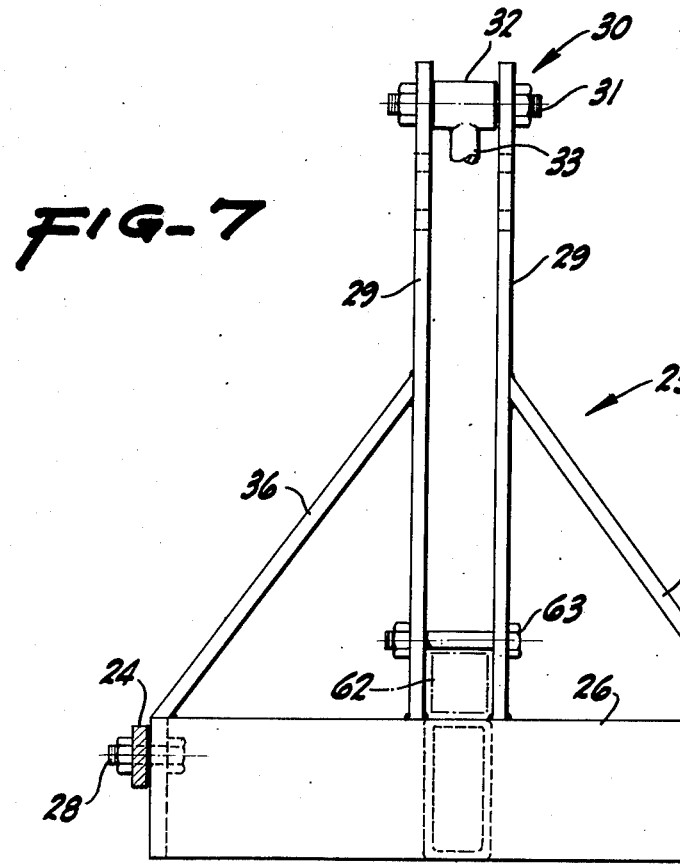
FIG. 7 is a fragmentary front elevational view to a somewhat enlarged scale showing a bellcrank lever of the present trailer; and, FIG. 8 is a side elevational view showing the present trailer prepared for towing by a pickup truck by means of a solid tow bar.

The trailer 11 is connected to the tractor 12 by means of a bellcrank 23 a portion of which is shown in detail in FIG. 7. The tractor 12 is provided with a hitch 25 including two fore and aft, transversely spaced mounting bars 24 or draft links, which define a fork spanning the ends of a transverse beam 26 of the bellcrank 23. Mounting tabs 27 are welded to the ends of the transverse beam 26 and extend rearwardly thereof. Transverse bolts 28 are passed through holes formed in the draft links 24 and tabs 27 in order rotatably to support the transverse beam 26.

The bellcrank 23 includes an upstanding arm portion 30 which is generally triangular in front elevation, as appears in FIG. 7. Extending upwardly from the transverse beam 26 are two parallel, transversely spaced arms 29. Journaled on a transverse pin 31 mounted on the upper end portion of the arms 29 is a bearing 32 carried on the after end of a control rod 33, or bar, of a conventional hydraulically-actuated parallelogram type linkage 34. Also illustrated in FIG. 7 are diagonal braces 36 extending between the transverse beam 26 and the arms 29 to afford additional strength to the bellcrank structure.

The bellcrank 23 further comprises a generally horizontal fore and aft arm 37 in the form of a channel similar to the transverse beam 26. The forward end of the arm 37 is welded to the center of the transverse beam 26 and, as indicated above, the ends of the transverse beam 26 are pivotally connected to the mounting bars 24 of the tractor 12 by the transverse bolts 28. Thus, the bellcrank 23 can pivot in a vertical fore and aft plane about the transverse axis of the bolts 28.

With particular reference to FIG. 4, a trailer centering mechanism 38 is connected to the after end of the arm 37. The centering mechanism 38 comprises an upper tubular sleeve 39 and a lower tubular sleeve 41. A vertical bar 42 welded to the upper sleeve 39 as at 35, is pivotally disposed in a vertical opening 40 in the lower sleeve 41. A spring retainer 43 is fixed to the lower end of the bar 42 and a strong compression spring 45 is interposed between the bottom of the lower sleeve 41 and the spring retainer 43. The spring 43 maintains the adjacent ends of the sleeves 39 and 41 in forceful engagement.

The lower end of the upper sleeve 39 and the upper end of the lower sleeve 41 are cut at conjugate bevel angles in such a manner as to engage to a maximum extent when the bellcrank arm 37 is longitudinally aligned with the fore and aft axis of the trailer bed 14. If the bellcrank arm 37 and the lower sleeve 41 attached thereto are moved out of alignment with the bed 14 as a result of any lateral forces imposed on the trailer the upper sleeve 39 is forced upwardly by the camming action of the lower sleeve 41 against the force of the spring 45 as illustrated in FIG. 5. Owing to the angular engagement of the adjacent ends of the sleeves 39 and 41, the force of the spring 45 urges the upper sleeve 39 from the elevated and angularly displaced position of FIG. 5 toward the position of FIG. 4, thus biasing the trailer bed 14 into longitudinal alignment with the fore and aft bellcrank arm 37.

Also illustrated in FIGS. 4 and 5 is a normally vertically oriented universal joint 44 connecting the centering mechanism 38 to the front lower portion of the bed 14. A lower clevis 46 comprises a pair of upstanding lugs 47 welded to the top of the upper sleeve 39 to define a yoke. A longitudinal clevis pin 48 in the form of a stud passes through fore and aft aligned holes in the lugs 47 and also through a hole in the lower end of a vertical connecting link 49, or bar. The clevis pin 48 is secured at its opposite ends by nuts 51 and 52 respectively. A limit stop member in the form of a transverse bar 53 with buffer pads 50 mounted on the upper outer ends of the bar 53 (see FIG. 6) is rigidly secured to the forward lug 47 by means of the nut 52 and lock washer 54. A transverse limit plate 56 extends downwardly from the plate 16 of the bed 14 above the limit stop bar 53 and defines the extent of lateral angular movement, or roll, of the trailer bed 14 relative to the longitudinal bellcrank arm 37 as either of the buffer pads 50 engages the limit plate 56, as in FIG. 6.

The universal joint 44 also comprises an upper clevis 57 including two transversely spaced lugs 58 defining a yoke welded to the bottom of the trailer bed plate 16 and a transverse clevis pin 59 which passes through holes in the lugs 58 and the upper end of the bar 49. The clevis pin 59 is also in the form of a stud and is secured at its opposite ends by nuts 61 (see FIG. 6).

FIGS. 2 and 3 most clearly illustrate the trailer 11 and the relative movement between the trailer and the tractor hitch 25 as well as the positions assumed by the centering mechanism 38 and the universal joint 44 towing and in dumping mode, respectively.

FIG. 2 shows the horizontal or towing position of the trailer 11. This mode is established by suitably positioning the hydraulically actuated linkage 34 as shown. The fore and aft bellcrank arm 37 is substantially horizontal and the trailer is likewise horizontal, ready for towing.

To tilt the bed 14 from the towing position of FIG. 2 to the dumping position of FIG. 3, it is only necessary to change the attitude of the components of the tractor's hydraulically actuated linkage 34 as shown. The bellcrank lever 23 is thereby elevated and concurrently is pivoted clockwise, as appears in FIG. 3. The left end of the arm 37 of the bellcrank lever 23 rises accordingly and lifts the front end of the bed 14. During this operation, the transverse clevis pin 59 constitutes a pivot axis for the bed 14 relative to the arm 37. The pin 59 also allows the forward end of the bed 14 to pitch up and down relative to the tractor 12 to conform to uneven terrain during towing or dumping.

The fore and aft clevis pin 48, on the other hand, allows rolling, or lateral rotation, of the bed 14 relative to the tractor 12 to conform to sharply crowned roadways or side hill terrain. The construction also permits the bed 14 to be raised to the dumping position at such an angle. However, in order to prevent overturning of the trailer 11 the limit plate 56 is arranged, as previously explained to engage with the buffer pads 50 on the ends of the limit stop bar 53 when the bed 14 attempts to roll to an excessive extend. As illustrated in FIG. 6 the limit stop bar 53 limits the range of lateral rolling movement of the bed relative to the arm 37 and tractor 12.

The universal mechanism 44, in other words, affords freedom of motion, within limits, in all three directions, pitch, roll and yaw, i.e. rotation, respectively, about a horizontal transverse axis, a horizontal fore and aft axis and a vertical axis.

The centering mechanism 38 illustrated in FIGS. 4 and 5 yieldably urges the bed 14 toward longitudinal alignment with the arm 37 and tractor 12, thereby greatly reducing yaw (rotation about the vertical bar 42) in both towing and dumping. Although the centering mechanism 38 yields, where necessary, to allow the tractor 12 and trailer 11 to point in different directions, as illustrated in FIG. 1, during towing, the centering mechanism 38 greatly reduces the tendency of the trailer 11 to "fishtail", and is thus a very desirable feature of the present invention.

As illustrated in FIGS. 7 and 8, the present trailer 11 may also be towed by means of a conventional solid tow bar 62 when it is not desired to utilize the dumping capability of the trailer 11. In this case the front of the bed 14 is supported by the tow bar 62. A bolt 63 is passed through holes in the arms 29 above the tow bar 62 by means of which the bellcrank lever 23 also is supported by the tow bar 62. The forward end of the tow bar can, if desired, be connected to the standard hitch 65 of a towing vehicle, such as a pickup truck 66.

In summary, it will be seen that the present invention provides a greatly simplified yet sturdy and effective two-wheeled dump trailer which can be towed in a very stable manner and tilted for dumping at any angle relative to the tow vehicle.

What is claimed is:

1. A dump trailer comprising:
   a. a bed having a forward end and an after end;
   b. a pair of ground engaging support wheels mounted on an after portion of said bed;
   c. a fore and aft elongated bellcrank pivotally connected at one end to a forward end portion of said bed, said bellcrank being further pivotally connected to a vehicle for towing the trailer,
   d. actuator means connected to the vehicle and to said bellcrank for pivoting said bellcrank in a normally vertical plane in order selectively to raise and lower the forward end of said bed, said bellcrank having a first arm pivotally connected to said bed and a second arm, said bellcrank being pivotally connected to the vehicle at a junction of said first and said second arms, said actuator means comprising hydraulically actuated linkage connected between the vehicle and said second arm of said bellcrank;
   e. a normally vertically extending universal joint pivotally connecting said one end of said bellcrank to the lower forward portion of said bed,
   said universal joint comprising a first clevis having a longitudinal clevis pin and a second clevis having a transverse clevis pin; and,
   f. trailer centering means interposed between said one end of said bellcrank and said universal joint for yieldably urging said bed and said bellcrank into longitudinal alignment,
   said centering means comprising an upper sleeve and a lower sleeve with normally fully engaging conjugate beveled ends, a rod fixed to said upper sleeve and slidably extending through said lower sleeve, and a commmpression spring urging said upper sleeve end into full engagement with said lower sleeve end.

2. A dump trailer as in claim 1 including a transverse limit stop member mounted on said first clevis, said bed being engageable with said limit stop member to limit the lateral rolling movement of said bed relative to said bellcrank.